Patented Feb. 14, 1928.

1,659,152

UNITED STATES PATENT OFFICE.

CLAYTON OLIN NORTH, OF TALLMADGE TOWNSHIP, SUMMIT COUNTY, OHIO, ASSIGNOR TO THE RUBBER SERVICE LABORATORIES CO., OF AKRON, OHIO, A CORPORATION OF OHIO.

ALIPHATIC ALDEHYDE DERIVATIVE OF THE CONDENSATION PRODUCT OF AN ALIPHATIC ALDEHYDE AND AN AROMATIC PRIMARY AMINE AND PROCESS OF MAKING SAME.

No Drawing.    Application filed March 24, 1923.   Serial No. 627,326.

Condensation products of aldehydes and amines have been known for some time as the so-called Schiff's bases. These materials have been prepared by the condensation of substantially equal molecular proportions of the interacting substances at a comparatively low temperature to avoid the loss of the easily volatile aldehydes in the exothermic reaction taking place. I have now found that if, in the manufacture of such materials, the time and intimacy of contact between the aldehyde and amine be increased and other reacting conditions imposed as are hereinafter set forth, a new type of compound results, in which the proportion of aldehyde combining with the amine is greater than is that required for the manufacture of a mono-molecular or of a polymerized condensation product.

Furthermore I have found that the manufacture of these derivatives of polymerized condensation products, proceeds, as do many chemical processes, in a series of steps or stages, and although I may carry the action to completion, I prefer to obtain a compound in which three molecular quantities of aldehyde react with two molecular quantities of aniline in the manner hereinafter disclosed.

It is, then, an object of my invention to provide a process whereby aldehyde derivatives of aldehyde-amine condensation products may be prepared. It is also an object of my invention to provide a process more particularly directed toward the preparation of aldehyde derivatives of dehydrated and polymerized condensation products of aldehydes and amines.

One method of preparing this new class of chemical substances is as follows:—A quantity of paraldehyde is run from storage into a measuring tank, and from there into a jacketed still, after which about 1% by weight of 20% sulfuric acid is added to the paraldehyde, whereupon the temperature in the jacket of the still is raised to about 90° centigrade. Vapors of the acetaldehyde are thereby evolved. Any other desired or practicable method of obtaining vapors of acetaldehyde may, of course, be followed. These vapors of acetaldehyde are passed thru a condenser, maintained at a temperature of about 30° centigrade by means of a cooling medium, and then are passed thru a tower, preferably suitably baffled, and of sufficient height to cause any liquid mechanically carried by the vapors to be caught and returned to the system.

The vapors of acetaldehyde are then passed thru a series of closed reaction chambers, each containing aniline, said reaction chambers being connected in series, whereby any vapors given off or not absorbed in the first chamber, pass into the second chamber, and from thence into a third reaction chamber. Altho a current of acetaldehyde vapor of any desired velocity may be passed thru a series of any desired number of chambers, I have found that I obtained the best results by passing a small current of vapor at rather moderate velocity thru a series of three chambers each containing aniline, as described. In this way, the greater part of the aldehyde vapor is absorbed in the first chamber or tank, until the main condensation reaction is completed. This reaction evolves quantities of heat and the mass quickly heats up to its maximum temperature. When this mixture begins to cool down, it indicates that the main condensation, and probably most of the polymerization reactions are completed. The product so obtained is believed to comprise substantial proportions of di-molecular-ethylidene-aniline as indicated in the equations hereinafter given. At this time heat is applied by means of steam coils within the tank to the contents of the first tank, thereby keeping the contents sufficiently fluid to permit the free and continued passage of acetaldehyde vapor; thru the hot mass and into the aniline contained in the second chamber until it in turn begins to cool. At this time, I run the contents of the first tank into a dehydrator and evaporator, and run the contents of the second tank into the first chamber, and the contents of the third chamber into the second chamber, and run fresh aniline into the third chamber. The contents of the dehydrator are then heat treated and dehydrated at a temperature not higher than 105° centigrade until a product results having a water content of less than 2%, whereupon my finished product is obtained. This material is the acetaldehyde derivative of dehydrated dimolecular ethylidene aniline, and is prepared by the combination of three molecular proportions of acetaldehyde to two molecular proportions of aniline. The product is a dark red to brown semi-liquid material at ordinary temperatures which softens at about 30° C. and is completely fluid at a slightly higher temperature.

It is, of course, evident to those skilled in the art of preparing chemical substances, that other methods of preparation of this material are possible. For example, any method of preparation may be followed which increases the time of contact between the interacting ingredients over that required for the preparation of a simple or polymerized ethylidene aniline, but I have found that satisfactory and consistant results follow the use of the process as disclosed particularly where the temperature maintained is sufficient to cause one of the interacting substances to exist in the form of a vapor.

In place of the aniline and acetaldehyde as set forth, other materials having an equivalent and similar action may be used. Thus the toluidines, the xylidines, or other primary amines, and preferably of the aromatic series, may be combined under proper reacting conditions with aldehydes, preferably of the aliphatic series, such as formaldehyde, propionaldehyde, or even the unsaturated aldehydes, such as acrolein, to produce condensation reaction products, which can be polymerized and dehydrated and combined with a further quantity of an aldehyde to produce a compound of the type as herein described. Moreover other compounds, such as the sulfur derivatives of aldehydes and amines, that is, the thio-aldehydes and thio-amines may be used.

The process of making the simple monomolecular that is, the non-polymerized condensation products of equimolecular quantities of aldehydes and amines thereby producing the compounds known as Schiff's bases, as, for example, anhydro formaldehyde aniline, ethylidene aniline, and the like, is well known in the art. In most cases, the reaction taking place may be represented by the following schematic relationship:—

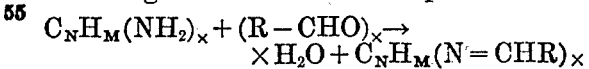

In the case of acetaldehyde and aniline, for example, Meyer and Jacobson, in vol. 2, page 179 of "Lehrbuch der Organischen Chemie" point out that the reaction, as exemplified in the general type reaction shown above, is the first change that takes place, whereby a simple mono-molecular condensation product, oil-like in character, is produced. The reaction is represented as follows:—

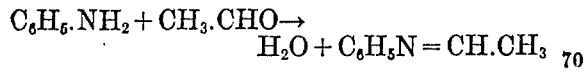

The oil, which is produced, ethylidene-aniline, undergoes polymerization on standing, and is transformed into solid crystallizable bases. This polymerization commonly takes place between two molecules of the simple condensation product first formed. Thus, according to Meyer-Jacobson, two molecules of the simple condensation product, combine as follows:—

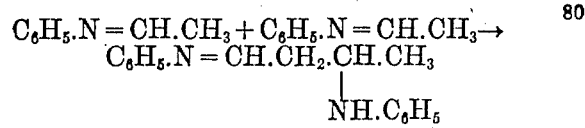

This dimolecular compound exists as a mixture of two isomeric modifications, one melting at 85.5° C., and the other melting at 126° C. These compounds are known as Eibner's and Eckstein's bases respectively, and have the molecular formula $C_{16}H_{18}N_2$ and exist as stereo-isomers. The first has the formula

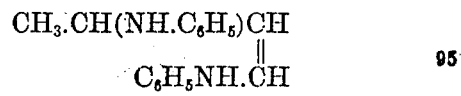

and the second

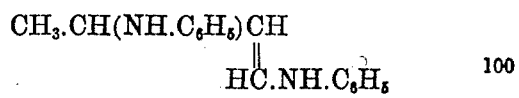

It is my theory that by carrying out the process in the manner set forth, wherein the first condensation reaction between the interacting substances probably produces a monomolecular compound, that this compound polymerizes to produce a di-molecular compound. Under the temperature conditions imposed, a greatly predominating proportion of one of the possible isomeric forms of the di-polymer is probably formed and this compound undergoes a partial or complete dehydration, or some other change which tends to form a derivative of tetra hydro quinoline which possesses a reactive methyl group, and it is this reactive methyl group which reacts with aldehydes in the manner I have just disclosed, to produce aldehyde derivatives, of what I prefer to term, the polymerized condensation products of aldehydes and amines. I do not intend to insist on the correctness of the theory just advanced, but simply offer it as one way in which to explain the actions involved. It is apparent then, that what I have actually prepared is an aldehyde derivative of a Schiff's base, obtained as set forth, by the action of a substantial excess of an aldehyde upon a Schiff's base.

The various compounds prepared as hereinbefore set forth, comprise valuable accelerators of the vulcanization of rubber as claimed in my Patent 1,467,984, issued September 11, 1923.

It is to be noted in the manufacture of the new class of compounds as described, that I employ the free amines and not the salts of the amines. The presence of such quantities of acid in the reacting mixture as would be needed to form a salt of an amine would result in the production of compounds of entirely different chemical characteristics than are possessed by the products resulting from the process as set forth.

Altho, in the example given, I described the use of acetaldehyde and aniline in the manufacture of the compound set forth, it is to be understood that my invention is not limited solely to the use of the compounds specified. Broadly my invention is applicable in the case of all amines and aldehydes which react under any conditions to form polymerized condensation products, which compounds I have now found, yield aldehyde derivatives. Neither is my invention limited by any theoretical statements which I have advanced, nor is it dependent upon the soundness or accuracy of such theoretical statements, but is limited solely by the following claims which are made a part of this application, and in which I intend to claim all novelty inherent in my invention, which is permissible in view of the prior art.

What I claim is:—

1. The process of preparing the aldehyde derivative of a reaction product of an aliphatic aldehyde and a primary aromatic amine, which comprises combining the free amine with more than an equimolecular proportion of the aldehyde at a temperature above 30° centigrade.

2. The process of preparing the aldehyde derivative of a reaction product of an aliphatic aldehyde and a primary aromatic amine which comprises combining the free amine with more than an equimolecular proportion of aldehyde at a temperature above the boiling point of the aldehyde.

3. The process of preparing the aldehyde derivative of a reaction product of an aliphatic aldehyde and a primary aromatic amine, which comprises combining more than an equi-molecular proportion of an aliphatic aldehyde with a primary aromatic amine by passing into said free amine more than an equi-molecular proportion of the vapor of an aliphatic aldehyde, maintaining the temperature of the mixture slightly above the boiling point of said aldehyde, and evaporating and dehydrating the resulting product at a temperature below 105° C.

4. The process of preparing the acetaldehyde derivative of a reaction product of acetaldehyde and aniline, which comprises combining aniline with more than an equi-molecular proportion of acetaldehyde at temperatures above the boiling point of the aldehyde, and dehydrating the product.

5. The process of preparing the acetaldehyde derivative of a dimolecular ethylidene aniline, which comprises combining more than an equi-molecular proportion of acetaldehyde with aniline by passing more than an equi-molecular proportion of the vapor of acetaldehyde through aniline maintained at a temperature above the boiling point of acetaldehyde, and evaporating and dehydrating the resulting material at a temperature below 105° C.

6. An accelerator of the vulcanization of rubber, comprising the aldehyde derivative of a condensation product of an aliphatic aldehyde and an aromatic primary amine, prepared by combining said free amine with more than an equi-molecular proportion of said aldehyde said derivative comprising a semi-liquid resin at ordinary temperatures.

7. The aldehyde derivative of a condensation product of an aliphatic aldehyde, and an aromatic primary amine, prepared by combining said free amine with more than an equi-molecular proportion of said aldehyde at temperatures slightly above the boiling point of the aldehyde said derivative comprising a semi-liquid resin at ordinary temperatures.

8. The aldehyde derivative of the condensation product of acetaldehyde and aniline, prepared by treating aniline with more than an equi-molecular proportion of acetaldehyde at a temperature above the boiling point of acetaldehyde, said derivative comprising a reddish brown, semi-liquid resin softening at about 30° C. and completely fluid at a slightly higher temperature.

9. The acetaldehyde derivative of dimolecular ethylidene aniline, prepared by combining aniline with more than an equi-molecular proportion of acetaldehyde at a temperature above the boiling point of acetaldehyde, and evaporating and dehydrating the product so formed at a temperature not above 105° C., said derivative comprising a reddish brown, semi-liquid resin softening at about 30° C. and completely fluid at a slightly higher temperature.

10. The aldehyde-amine reaction product formed by the combination of substantially three molecular proportions of acetaldehyde with substantially two molecular proportions of aniline, said derivative comprising a reddish brown, semi-liquid resin softening at about 30° C. and completely fluid at a slightly higher temperature.

11. The process of preparing the aldehyde derivative of the reaction product of an aliphatic aldehyde and an aromatic primary amine, which comprises reacting an aliphatic aldehyde and a free aromatic primary amine to produce a condensation product, polymerizing said condensation product by heating, the polymerized condensation product with an additional quantity of an aliphatic aldehyde, and dehydrating the product so formed.

12. The process of preparing the acetaldehyde derivative of polymerized ethylidene aniline, which comprises passing the vapor of acetaldehyde into the condensation product of equimolecular proportions of acetaldehyde and aniline, maintained at a temperature not more than 20° above the boiling point of the acetaldehyde.

13. The process of preparing an eccelerator for use in the vulcanization of rubber which comprises passing vapors of an aliphatic aldehyde into an aromatic primary amine to form a condensation product, polymerizing said condensation product by heating, said polymerized product with an additional quantity of vaporized aldehyde to form a further condensation product and dehydrating said final condensation product.

14. The process of preparing an accelerator for use in the vulcanization of rubber, which comprises passing vapors of acetaldehyde into aniline to form ethylidene aniline, polymerizing said ethylidene aniline by heating, said polymerized ethylidene aniline with an additional quantity of acetaldehyde and dehydrating the resulting product.

15. A process according to claim 14 in which substantially three molecular proportions of acetaldehyde are combined with substantially two molecular proportions of aniline.

16. The process of preparing the aldehyde derivative of a Schiff's base which comprises reacting a Schiff's base with the vapor of an aldehyde.

17. The process of preparing the aldehyde derivative of a Schiff's base which comprises reacting aniline with more than an equimolecular proportion of acetaldehyde supplied in a vaporized condition.

18. The aldehyde derivative of a reaction product of an aliphatic aldehyde and an aromatic primary amine, said derivative possessing a carbon and hydrogen ratio greater and a nitrogen content smaller than that possible from the combination of equimolecular proportions of said aldehyde and said amine and being substantially fluid at a temperature of approximately 30° C.

19. The acetaldehyde derivative of a reaction product of acetaldehyde and aniline, said derivative possessing a carbon and hydrogen ratio greater than that possible from the combination of equi-molecular proportions of acetaldehyde and aniline, said derivative softening at approximately 30° C. and substantially fluid at a slightly higher temperature.

CLAYTON OLIN NORTH.